United States Patent [19]

McMillen et al.

[11] 4,148,323

[45] Apr. 10, 1979

[54] SWEPT BACK IMPELLER BLADE FOR AXIAL FLOW ROTOR

[75] Inventors: Richard E. McMillen, Geneseo; Robert L. Francis; Richard A. DePauw, both of East Moline, all of Ill.

[73] Assignee: International Harvester Company, Chicago, Ill.

[21] Appl. No.: 853,774

[22] Filed: Nov. 21, 1977

[51] Int. Cl.² ............................................ A01F 12/18
[52] U.S. Cl. ................................................ 130/27 T
[58] Field of Search ............ 130/27 T, 27 HA, 27 R; 56/14.6

[56] References Cited

U.S. PATENT DOCUMENTS 3,827,443  8/1974  Drayer ............................... 130/27 T Primary Examiner—Jay N. Eskovitz
Attorney, Agent, or Firm—F. David AuBuchon

[57] ABSTRACT

An apparatus for accepting unthrashed material that is being fed axially into the cylinder of an axially flow combine. The apparatus includes a three bladed impeller that when rotated generates a frustum of a cone with the larger end of the cone frustum being generated by the leading edges of the impeller blades. The leading edge of each impeller blade being swept back such that the outermost portion of the leading edge of the impeller blade trails a line radiating from the point on the rotor axis where the impeller blade originates from.

8 Claims, 3 Drawing Figures

SWEPT BACK IMPELLER BLADE FOR AXIAL FLOW ROTOR

The improved impeller unit comprising the present invention has been designed primarily for use as an infeed impeller for an axial flow combine. The invention is disclosed for use on an infeed impeller that generates when rotated a frustum of a cone of the type disclosed in U.S. Pat. No. 3,827,443 that issued on Aug. 6, 1974. The entire subject matter of U.S. Pat. No. 3,827,443 insofar as it is consistant with the present disclosure, is incorporated in and made a part of the present application by reference thereto. However, the invention can be used on an impeller that generates when rotated, other configurations such as a cylinder. Although the invention is disclosed in an axial flow combine having a single rotor it could also be used in an axial flow combine having multiple rotors. Irrespective of the particular configuration generated by the impeller or the number of rotors used in the machine the essential features thereof remains substantially the same.

Heretofore the leading edges of impeller blades extended either axially as in the above-mentioned U.S. Pat. No. 3,827,443 or extended forwardly into the direction of travel of the impeller blade as shown in U.S. Pat. No. 3,537,460. While both of these configurations performed adequately the present invention is an improvement over these configurations since it permits the impeller to accept and feed rearwardly a greater volume of material and decreases the tendency of material fed into the impeller to become tangled around the rotor axis.

The transition section that surrounds the rotor impeller conforms in shape to the shape generated by the impeller when it is rotated. This transition section has transport fins fixedly disposed on its inner surface which cooperate with the impeller to impart a rearward motion to the unthrashed material being received by the impeller. By sweeping the leading edge of the impeller blades back relative to the direction of rotation an initial outward component of force is exerted on the material as it encounters the impeller causing the material to move towards the transition section where it is influenced by the transport fins. The transport fins cause the material to move rearwardly of the rotor making room for more material to be received by the impeller. By exerting an initial force on the incoming material in an outward direction the likelihood of this material being tangled around the rotor axis is decreased and the reliability of the infeed system is improved.

In the accompanying two sheets of drawing forming a part of this specification one illustrative embodiment of the invention has been shown.

Figure 1:
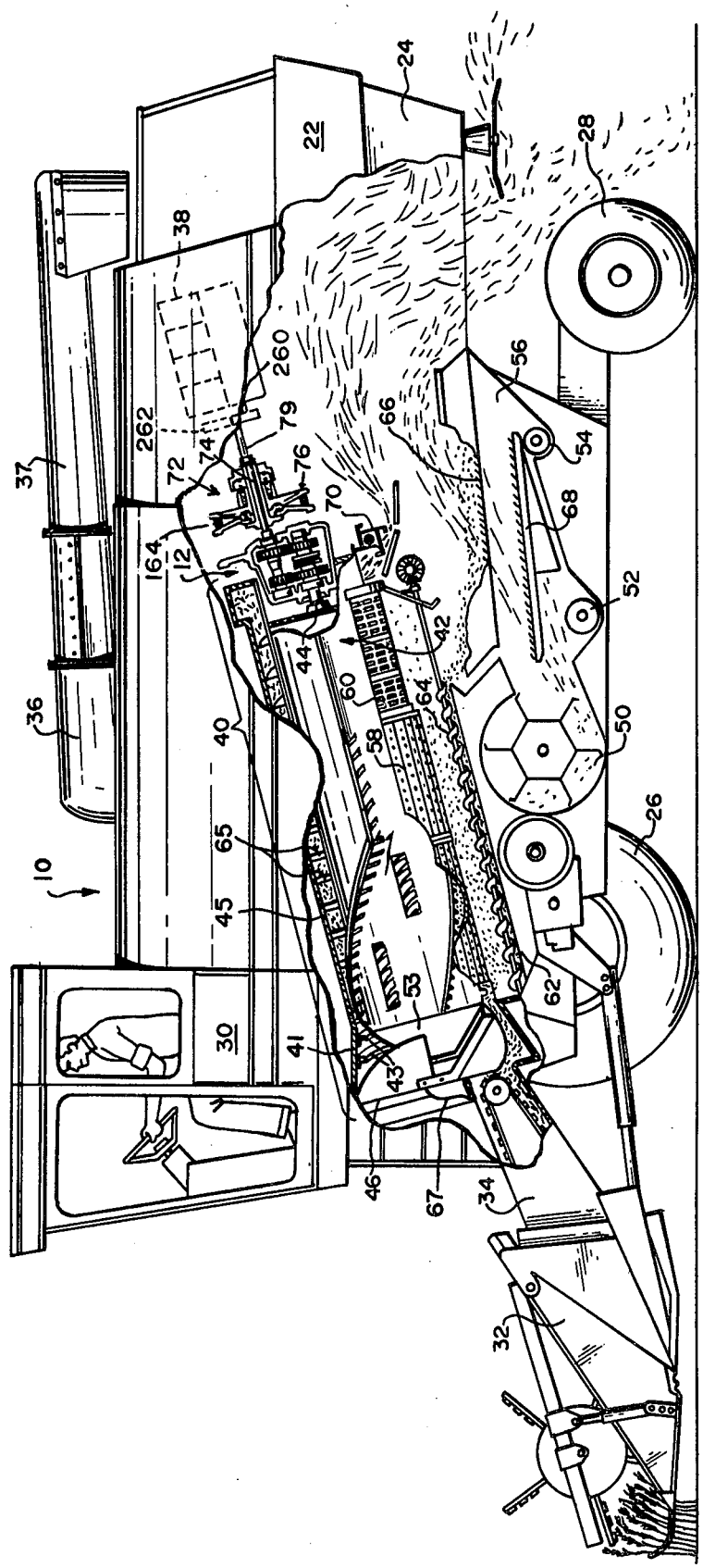
FIG. 1 is a side elevation view, partly in section, of an axial flow-type combine with a major portion of one sidewall being broken away to reveal the crop gathering means, the crop feeding means, the crop impelling means, the axial thrashing and separating means, the grain cleaning and handling means and the residue discharge means.

The impeller unit 100 has been particularly designed for use in the infeed portion of an axial flow combine such as disclosed in the U.S. Pat. No. 3,982,548 to Stamp et al that issued on Sept. 28, 1976. Accordingly, such a combine is shown in FIG. 1 and designated in its entirety by the reference numeral 10. The combine 10 involved in its general organization a chassis or body 22 having vertical side walls 24, the body portion being supported by a pair of relatively large driven wheels 26 in the front region of the combine, and a pair of steerable wheels 28 at the rear thereof. The combine 20 further includes an operator's platform and cab 30, a crop gathering header 32, a feeder 34, a grain elevator 36 from which there extends a grain delivery chute 37, and an engine 38. A grain tank (not shown) is enclosed within the walls of the body portion 22.

As is the case in connection with axial flow type combines of the character under consideration, the axial thrashing and separating means are embodied in an elongated and generally cylindrical member 40 in the form of a rotor casing having a coaxial rotor 42 mounted therein, the rotor being provided with a central rotor shaft 44. The forward end of the rotor shaft carries a vaned impeller 46. Other conventional components not specifically related to the present invention, and which are more or less schematically illustrated herein, are the blower 50, grain auger 52 leading to the aforementioned grain elevator 36 and a tailings auger 54, these components being enclosed within a lower casing section 56 beneath the chassis or body portion 22. The lower portion of the rotor casing 40 is made up of the usual concave 58 and a grate 60. A conveyor structure 62 having augers 64 associated therewith is disposed beneath a rotor casing 40 and receives separated grain from the concave and grate sections 58 and 60 and discharges the grain onto a chaffer sieve 66. Such sieve is reciprocated in the fore-and-aft direction so as to pass the grain and tailings to a grain sieve 68 which also is reciprocated in order to separate the tailings so that the grain passes through such sieve and into the grain auger 52 while the tailings are returned to the rotor casing 40 by elevator means (not shown). A terminal beater 70 at the rear end of the rotor casing 40 prepares the residue for discharge from the combine rearwardly thereof. The engine 38 drives the rotor shaft 44 through the drive shaft 260 pulley and idler arrangement 262 jackshaft 79, belt 164, input sheave 76, input shaft 74, and the gear case mechanism 12. For a more detailed disclosure of such a drive for the rotor reference can be had to copending D-3351, entitled 2-SPEED ROTOR GEAR CASE. The entire subject matter of this application insofar as it is consistent with the present disclosure, is incorporated in and made a part of the present application by reference thereto.

The arrangement of parts thus far described is conventional and no claim is made herein to any novelty associated with the same, the novelty of the present invention resides rather in the novel structure of the vaned impeller 46 and its cooperation with the transition section 41 of the rotor casing 40. It should be noted that material is fed endwise of the rotor casing for reception into the transition section 41. The transition section 41 has a series of transport fins 43 secured to its inner surface which function in cooperation with the vaned impeller to move the material entering the rotor casing rearwardly into the cylindrical portion 45 of the rotor casing.

As will be described in greater detail presently, the vaned impeller 46 closely mates with the inner frusto conical surface of the transition section 41, this feature constituting an important aspect of the present invention. The material which enters the cylindrical portion 45 of the casing 40 is processed as it travels rearwardly, the thrashed grain escaping from the casing through the aperture bottom which is made up of the concave 58 and the grate 60. The straw and other waste material is discharged through a discharge opening formed in the lower region of the rear end portion of the casing 40. A plurality of spiral transport fins 65 are fixedly secured to the upper internal surface of the cylindrical section 45, these fins functioning to index material axially through the casing from the frusto conical transition section 41 to the straw discharge opening.

Figure 2:
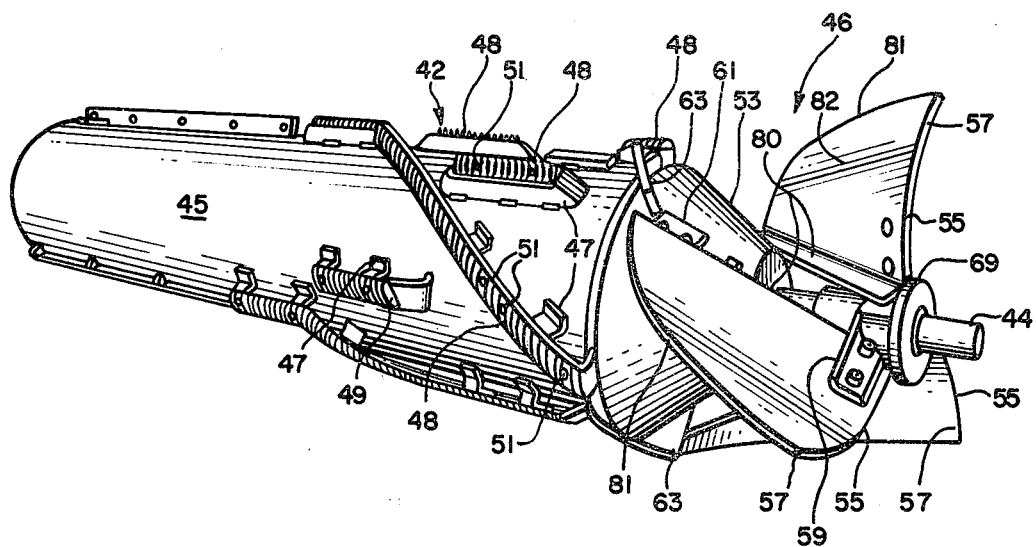
FIG. 2 is a view showing the rotor removed from the combine which includes the impeller made up of three blades having swept back leading edges.
Figure 3:
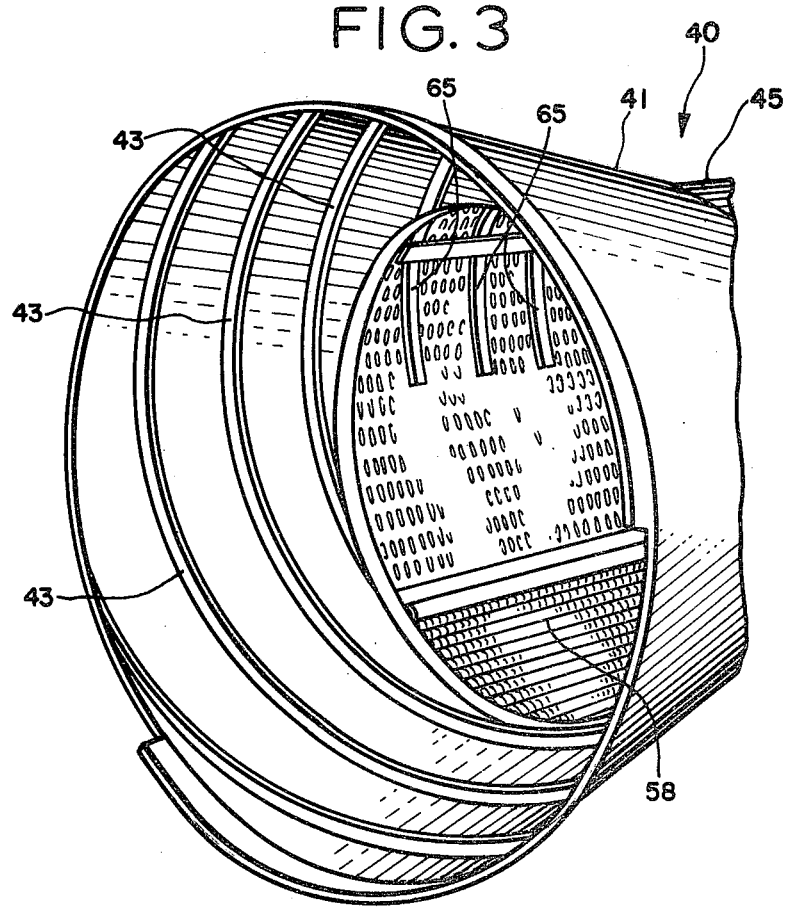
FIG. 3 is a fragmentary front perspective view of the rotor casing including the transition section having transport fins on the internal surface thereof.

The rotor 42 is rotatably journalled for operation within the casing 40, and is designed such that its direction of rotation is counterclockwise as viewed from the front of the combine, for example, as seen in FIGS. 2 and 3. The forward rotor shaft 44 is rotatably journalled in a shielded bearing assembly 67 which is supported by an enclosed within the casing 40.

The shielded bearing assembly 67 can also function as an anti-wrap shed bar to divert the crop material entering the rotor casing 40 and prevent the same from bridging across the front of the impeller blade and forming a torus which otherwise would block the path of other material entering between such blades. A shielded bearing assemblies 67 in addition, further functions as a bearing shield and protector. Such multi-purpose functions of the shielded bearing assembly constitutes the subject matter of U.S. Pat. No. 3,828,794 that issued on Aug. 13, 1974 and which is entitled "Crop-diverting Shed Bar and Bearing Protector for Axial Flow-type Combine". The entire subject matter of U.S. Pat. No. 3,828,794 insofar as it is consistent with the present disclosure, is incorporated in and made a part of the present application by reference thereto.

The rotor as best shown in FIG. 2 is made up of a cylindrical section 45 having a frusto conical section 53 at the foward end with the rotor shaft 44 extending forwardly therefrom. There are a number of raised platforms 47 to which the rasp bars 48 are secured by nuts and bolts 51. The outer surface of the rasp bars 48 are formed by a plurality of fines 49 that extend diagonally to the longitudinal direction of the rasp bar. The fins 49 are concentrically formed from the front to the rear which enables the entire rasp bar to be removed and replaced in the opposite direction thus extending the useful life of the rasp bar. One surface of the fin is exposed and tends to wear during operation and when the rasp bar is removed and replaced in the opposite direction the other surface of the fin will be exposed. The vaned impeller 46 is made up of three identical impeller blades equally spaced around the rotor shaft 44. It should be understood that the impeller could be made up of two, four or more identical impeller blades and the number of blades is determined by other design factors such as rotor diameter. Each impeller blade has a material engaging surface defined by a base edge 80 that extends diagonal to the rotor shaft 44, an outer edge 81 that extends along and is adjacent to the transport fins 43 on the inner surface of the transition section 41 and a leading edge 55. The leading edge 55 of the impeller blades extends radially with respect to the rotor shaft 44 for a portion of its length and also includes a swept back portion 57. The entire leading edge 55, including the swept back portion 57, lies in the plane that is normal to the rotor shaft 44. The material engaging surface of each impeller blade is bent along a line 82 extending rearwardly from the point on the leading edge where the radial portion joins the non-radial or swept back portion 57. The vaned impeller 46 generates when rotated a funnel-like frusto conical shape that closely corresponds to the funnel-like frusto conical shape of transition section 41. A hub 69 is secured to the rotor shaft 44 at its forward end and three front brackets 59 are secured to this hub 69. Three rear bracket 61 are secured to the frusto conical section 53 of the rotor and the impeller blades are secured by nuts and bolts to these brackets 59 and 61. A small extension plate 63 cooperates with each of the three impeller blades extending from the rearward corner of the impeller blade to the corresponding helical rasp bar 48. It should be noted that there are three helical rasp bars, one for cooperation with each of the three impeller blades.

The frusto conical section 41 of the rotor casing 40 with the spiral transport fins 43 secured to its internal surface cooperates with the vaned impeller 46 to funnel the crop material into the cylindrical section 45 of the rotor casing 40. The material engaging surface of the impeller blade that trails the swept back portion 57 of the leading edge imparts a force to the incoming material in a radial direction causing it to come in contact with the internal surface of the transition section 41 and the spiral transport fins 43. The spiral transport fins exert a positive force on the material moving it rearwardly towards the cylindrical section 45 thus clearing the leading edge so that additional material can be received. The function of moving the material radially has the added advantage that it reduces the possibility of the material bridging the front of the impeller blades and fouling the bearing at the front end of the rotor. Through the use of the swept back impeller blades the rate of feeding material to the motor has been improved.

The invention is not to be limited to the exact arrangement of parts shown in the Company drawings or described in this specification. As various changes in the details of construction may be resorted to without departing from the spirit of the invention. Also, although the invention is disclosed for use in a single rotor axially flow combine it could be used in a multiple rotor axial flow combine of the type disclosed in U.S. Pat. No. 3,994,303 that issued on Nov. 30, 1976.

What is claimed is:

1. In an axial flow combine, in combination, an elongated generally cylindrical rotor casing, the forward end of said casing being provided with a transition section designed for endwise reception of crop material, transport fins on the inner surface of said transition section, a rotor including a rotor shaft disposed with said casing in coaxial relationship therewith, said rotor being designed for rotation in a given direction, an impeller on said rotor coextensive with said transition section of the casing, said impeller composed of a plurality of impeller blades, each impeller blade having a material engaging surface which surface is defined by a base edge that extends diagonal to said rotor shaft, an outer edge that is adjacent to said transport fins on the inner surface of said transition section, and a leading edge, each leading edge defined by a radial portion emerging from the rotor shaft and a non-radial continuation of said radial portion, said non-radial portion being swept back relative to said given direction of rotor rotation, both the radial and non-radial portions of said leading edge lying in a plane that is substantially normal to said rotor shaft.

2. The invention as set forth in claim 1 wherein said transition section has a funnel-like frusto-conical shape with the crop entering of the large end, and wherein said impeller generates, when rotated a similar funnel-like frusto-conical shape.

3. The invention as set forth in claim 1 wherein the material engaging surface of each impeller blade is bent along a line extending rearwardly from the point on the leading edge where the radial portions joins the non-radial portion.

4. The invention as set forth in claim 2 wherein the material engaging surface of each impeller blade is bent along a line extending rearwardly from the point on the leading edge where the radial portions joins the non-radial portion.

5. The invention as set forth in claim 1 wherein there are three impeller blades equally spaced around said rotor shaft.

6. The invention as set forth in claim 2 wherein there are three impeller blades equally spaced around said rotor shaft.

7. The invention as set forth in claim 3 wherein there are three impeller blades equally spaced around said rotor shaft.

8. The invention as set forth in claim 4 wherein there are three impeller blades equally spaced around said rotor shaft.

* * * * *